Jan. 17, 1961  J. W. MYDELS  2,968,356
TELESCOPIC BEAMING DEVICE
Filed July 11, 1955  2 Sheets-Sheet 2

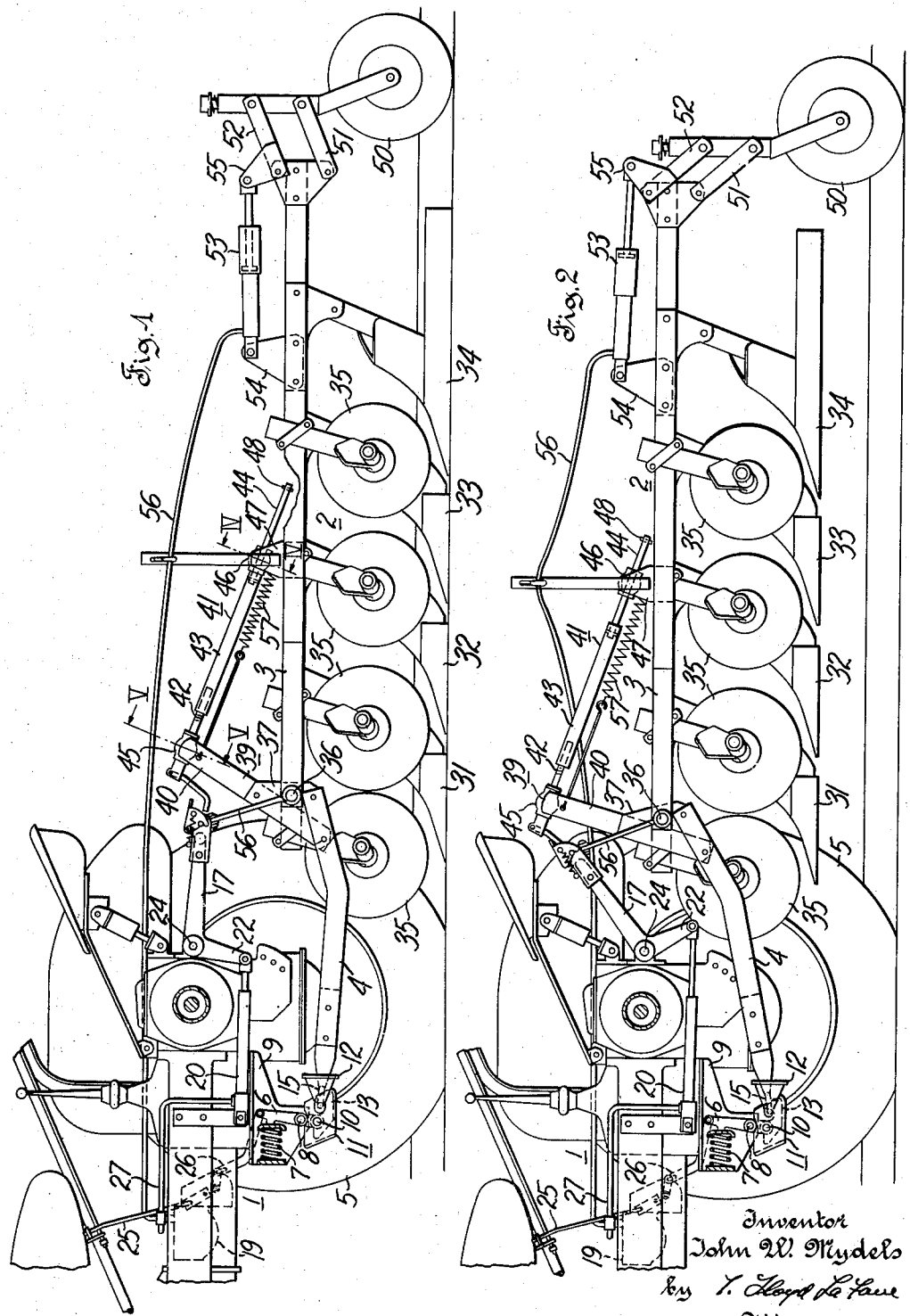

Inventor
John W. Mydels
By T. Lloyd La Save
Attorney

United States Patent Office 2,968,356
Patented Jan. 17, 1961

2,968,356
TELESCOPIC BEAMING DEVICE

John W. Mydels, La Crosse, Wis., assignor to Allis-Chalmers Manufacturing Company, Milwaukee, Wis.

Filed July 11, 1955, Ser. No. 520,983
7 Claims. (Cl. 172—395)

This invention relates to tractor propelled implements, and it is concerned more particularly with an improved beaming device for a tractor propelled plow or similar implement.

Beaming of a plow is generally understood to mean an adjustment of the vertical angle between the plow bottom supporting frame and its associated draft pole in accordance with the depth of soil penetration at which the plow is desired to operate.

Heretofore it has been usual to effect such beaming by means of a longitudinally rigid member that was longitudinally adjustable and that rigidly united the draft pole and implement frame at all adjusted positions against relative vertical movement therebetween. For a tractor attached pickup type plow which is to be supported in transport entirely by the tractor, it is usual to connect the draft pole rigidly with the implement frame so as to prevent uncontrolled downward swinging of the plow frame relative to the draft pole.

When used in a wheeled, pull type implement, such as a plow having a vertically adjustable ground support wheel, rigid beaming means of conventional construction would cause the trailing end of the plow to raise considerably more than the forward end when the plow frame is swung upward about the draft pole hitch point on the tractor. To sufficiently raise the forward end of such a plow, the ground support wheel may be located, not at the trailing end, but near the forward end thereof. In either case, however, front and rear plow bottoms would enter the soil successively upon lowering the frame relative to the tractor, and the rearward plow bottom would be the first to leave the soil upon raising the implement frame.

It is an object of the present invention to provide an improved tractor propelled implement, such as a plow, having beaming means operatively uniting the implement frame and draft pole so that the trailing end of the frame will be urged downward and so that upon lifting of the plow the front portion of the frame may rise at a rate of speed not slower than the rear portion of the frame.

Another object of the invention is to provide a tractor propelled plow with beaming means that limits in only one direction the vertical angle between the plow frame and a draft pole.

Another object of the invention is to provide a tractor propelled plow with beaming means between plow frame and draft pole that permits mounting a ground support wheel at the trailing end of the plow frame.

Another object of the invention is to provide an improved beaming device that lends itself to use with implements that are intended to have the forward end first raised upon raising of the implement and the forward end first lowered upon lowering of the implement.

Another object of the invention is to connect an implement frame with its draft pole by means of a beaming device which secures the implement frame against swinging on the draft pole in upward direction only and from selected positions.

Another object of the present invention is to provide simple and economical pivot mountings for the ends of a beaming screw of a tractor propelled implement.

Other objects and advantages of the invention are obtained and will be apparent from the following description and accompanying drawings, in which:

Fig. 1 is a side view in elevation, with portions broken away, of a tractor and a trailing implement embodying the present invention;

Fig. 2 is a view like that of Fig. 1, but with the implement supported in transport position;

Figure 3:
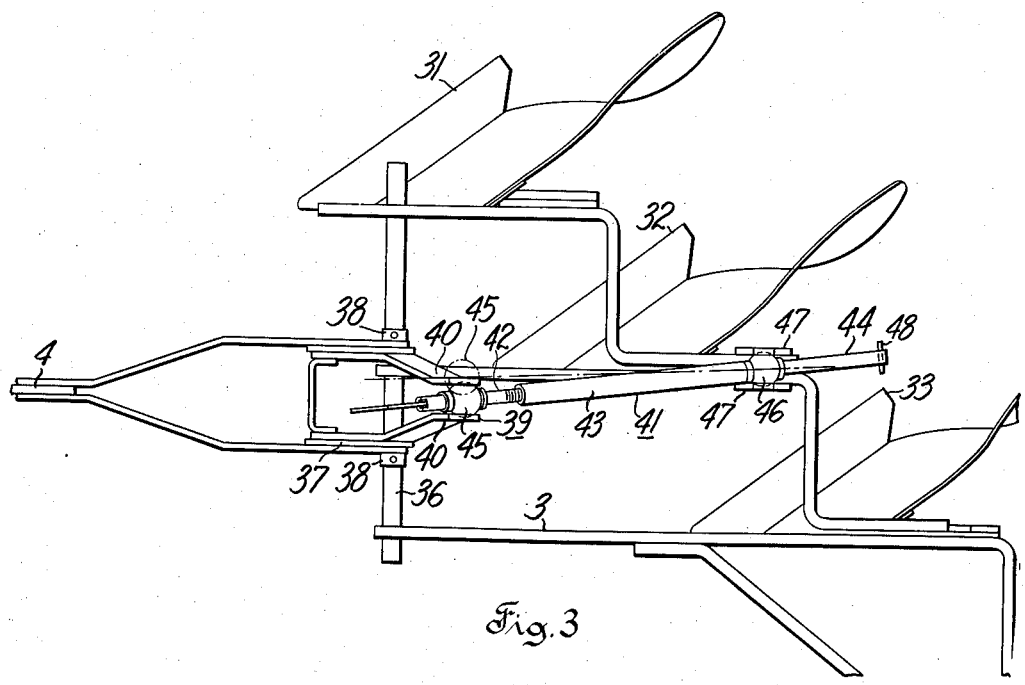
Fig. 3 is a plan view of a portion of the implement shown in Fig. 1 to illustrate lateral adjustment of one end of the beaming screw.
Figure 4:
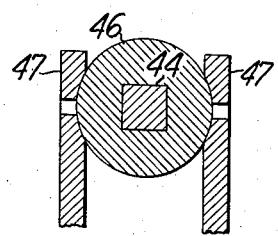
Fig. 4 is a sectional view of a pivot support for a beaming screw support taken along the lines IV—IV of Fig. 1.
Figure 5:
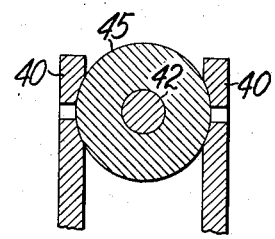
Fig. 5 is a sectional view of another pivot support for the beaming screw taken along lines V—V of Fig. 1.

Referring to the drawings, Figs. 1 and 2 show the present invention as applied to an implement propelled by a tractor 1. The implement may be a plow 2 having a beaming structure for adjusting the vertical angular positions between implement frame 3 and the implement pull bar, draft tongue or draft pole 4.

The tractor is conventional and comprises a power unit, not shown, supported by rear wheels 5 and coupled in driving relation to the rear axle for these wheels. The tractor has a hitch yoke depending from its main body to define a hitch point below and forwardly of the tractor rear axle. The hitch yoke comprises a draft control lever 6 biased by a spring 7. Lever 6 is pivotally supported on a rod 8 extending through a bracket 9 rigid with the tractor. A transversely disposed pivot pin 10 at the lower end of lever 6 supports a quick hitch coupler 11 having a funnel shaped housing 12 for receiving a forward end of the implement draft tongue or draft pole 4. The coupler has a vertically pivotal latch member 13 which detachably engages an eye 15 or loop in the forward end of the draft pole. The hitch connection provides a second pivot center which permits the draft pole 4 to freely swing vertically and horizontally about the hitch yoke.

The tractor has power lift arms 17 transversely spaced and extending rearwardly of the tractor. The lift arms are connected to a hydraulic actuating mechanism including a pump 19 deriving power from the tractor engine and rams 20 pivotally mounted on the tractor and hinged to crank arms 22 to pivot the lift arms on the axis of shaft 24. The rams 20 are connected to pump 19 through a supply line 27 including a valve mechanism, not shown, controlled through linkage 25 by a hand lever, not shown, selectively permitting manual control of the lift arms, or automatic control of the lift arms in response to changes in the propelling force required of the tractor. The draft responsive control valve, not shown, is operated by linkage 26 operatively connected to draft control lever 6 and to the manual control means. Such draft responsive mechanism is of the type shown and described in U.S. Patent 2,679,199, W. F. Strehlow, May 24, 1954.

The trailing implement shown is a moldboard plow having four bottoms 31 through 34 laterally and longitudinally spaced from each other and rigidly secured to beams forming part of frame 3. Each bottom has a colter 35 associated therewith in a known manner, with each colter disposed forwardly of its bottom and adjustably mounted on a bottom supporting beam.

Frame 3 includes a transverse bar 36 disposed forwardly of the frame and to which the forward end of the plow beams are attached. Draft pole 4 is connected to transverse bar 36, which is a second transverse pivot center at a forward portion of the frame, so that the draft pole is vertically swingable relative to frame 3 about the transverse pivot center formed by transverse member 36. Such connection is provided by plate structure 37 pivotally mounted on transverse bar 36 with draft pole 4 rigidly secured to plate structure 37. Collars 38 are disposed on transverse member 36 on opposite sides of plate structure 37 and have set screws for detachably securing the collars to transverse member 36 and to thus readily provide lateral adjustment of the draft pole on transverse bar 36.

A beaming tower 39, or first part rigid extension of draft pole 4 beyond its connection with frame 3, is formed by a pair of laterally spaced plates rigidly secured at their lower ends to plate structure 37.

Referring to Figs. 1 and 2, beaming tower 39 and a portion of frame 3 form two legs of a triangle. Plow beaming adjustment includes structure joining the free ends of these two legs and forming the third leg of the triangle. Such third leg 41 of the triangle is adjustable and includes a lost motion connection that limits relative upward swinging movement of implement frame 3 on the draft pole 4 and permits relative downward swinging of the implement frame on the draft pole.

The lost motion beaming adjustment is shown as comprising a rigid longitudinally adjustable member pivotally supported at one end in the beaming tower and at its other end by a lost motion connection in the frame 3. A rod or screw 42 is in threaded telescoping engagement with one end of a tube 43 which has a rod 44 extending from the other end thereof. Screw 42 and rod 44 are supported by universal pivots provided by balls 45, 46. Balls 45, 46 have apertures for receiving therethrough the screw 42 and the rod 44, respectively. Suitable collars secured to screw 42 on opposite sides of ball 45 prevent longitudinal movement of screw 42 therein. Laterally spaced plates 40 of the beaming tower are provided with spherical recesses or laterally aligned concave spherical bearing surfaces in adjacent faces to form a bearing seat for ball 45. The plates 40 are fastened together by suitable means to secure ball 45 on its bearing seat.

Ball pivot 46 is similarly secured in a second part comprising laterally spaced plates 47 secured to frame 3 at a point spaced rearwardly of the first part and of the transverse pivot center defined by transverse bar 36. Plates 47 are provided with spherical recesses or laterally aligned concave spherical bearing surfaces in adjacent faces of the plates to form a bearing seat for ball 46. Plates 47 are suitably secured together to hold ball 46 on its bearing seat.

Rod 44 may be secured to ball 46 against relative longitudinal and rotational movement, and the rod 44 permitted to slide or telescope in tube 43 while prevented from rotating relative thereto to provide lost motion. Lost motion is preferably provided as shown however by relative longitudinal movement between rod 44 and ball 46. Rod 44 has irregular cross section which, preferably, is square and passes through a correspondingly shaped hole in ball 46 so that there will not be relative rotation between rod 44 and ball 46 upon adjustment of screw 42. Tube 43 is larger than rod 44 and forms a shoulder or stop that abuts ball 46. The free end of rod 44 may be provided with a stop collar or pin 48 so that while rod 44 is free to slide longitudinally through ball 46 such sliding movement is limited by stops provided by the end of tube 43 and by pin 48.

Balls 45 and 46 pivot in a vertical plane on their bearing seats in brackets 40 and 47, respectively, upon adjustment of the beaming screw and upon vertical swinging of the implement frame on draft pole 4 as permitted by the lost motion in the beaming screw. Balls 45 and 46 also pivot in a horizontal plane upon lateral adjustment of the beaming device in which the ball 45 and the axis of the beaming screw is displaced laterally, as shown by dotted lines in Fig. 3. Such lateral adjustment is provided by loosening set screws for collars 38 and moving the draft pole laterally on transverse bar 36 and resetting the set screws to secure collars 38 and draft pole 4 in position.

A ground engaging caster type wheel 50 is suitably supported through parallel links 51, 52 to raise and lower wheel 50 relative to frame 3 by means comprising a hydraulic ram 53. One end of ram 53 is pivotally secured to an upright 54 rigid with frame 3 and the other end of ram 53 is pivotally attached to a crank arm 55 on link 52. A fluid pressure supply line 56 connects ram 53 with the hydraulic system of the tractor which dictates the lowering of the wheel relative to frame 3 either by manual adjustment of the hydraulic control system or automatically in response to a predetermined condition of the system, which also permits selective sequential and simultaneous actuation of tractor rams 20 relative to implement ram 53.

The implement support wheel is effective to raise the entire implement frame, with the forward end supported by draft pole 4 at the hitch point on the tractor, since the lost motion beaming connection prevents upward swinging of the implement frame relative to draft pole 4. Means provided for lifting the forward end of the implement include tractor lift arms 17 which are connected to the forward end of implement frame 3. The laterally spaced lift arms are connected by suitable means such as lift links 56 suitably pivotally connected to opposite ends of transverse bar 36 and also pivotally connected to the ends of lift arms 17 in a known manner.

The position of the implement in Fig. 1 shows the plow bottoms and the support wheel resting on the ground. In this position the draft pole is vertically supported at its forward end by the tractor and, if unhitched therefrom, the draft pole could swing downward about its pivot center with frame 3. However, a tension spring 57 is secured between the tower and the frame adjacent the ball pivots for the beaming adjustment and causes the draft pole to swing upward, when unhitched from the tractor, until the end of tube 43 abuts ball 46 to limit such upward swinging movement. As shown in Fig. 1 the beaming screw is adjusted to hold the draft pole in the position shown so the forward end of the draft pole will be at the level of the hitch coupler on the tractor.

Fig. 2 shows the implement in transport position with the tractor power lift arms having raised the forward end of the implement off the ground and with the trailing ground support wheel, actuated by ram 53, having raised the trailing end of the implement. The beaming adjustment is the same as in Fig. 1, but the lost motion provided thereby causes rod 44 to slide upward through ball 46 thereby permitting relative downward swinging of frame 3 on draft pole 4 about transverse pivot center provided by transverse bar 36 while the draft pole is swinging upward relative to tractor 1 about the pivot center provided by hitch 11.

To obtain a predetermined furrow depth the beaming screw would be turned in to shorten the fixed spacing between balls 45, 46, thereby lowering the level at which the draft pole supports the forward end of the implement allowing the nose of the plow to enter the soil until the stop in the beaming adjustment forces the trailing end of the plow to level with the forward end. The plow seeks an operating depth as determined by the beaming angle between the draft pole and the plow frame selected by the adjustment of the beaming device. The plow is free to seek such a preselected operating depth because the power lift mechanism is not utilized to support the front end of the implement during normal plowing conditions.

Because of the lost motion connection permitting relative downward swinging of implement frame 3 on draft pole 4, the lift arms may be utilized to lift the forward end of the frame and thereby incline the plow upward without also raising the trailing end of the plow and without changing the adjustment of the beaming screw.

While the invention has been shown relative to a tractor and trailing plow having a ground support wheel, it should be obvious that the invention may be applied to other attached implements, and that changes and modifications within the scope of the appended claims may readily occur to those skilled in the art.

It is claimed and desired to secure by Letters Patent:

1. A tractor propelled plow comprising, in combination, a rigid plow supporting frame comprising a transverse lift bar presenting opposite ends adapted for connection with a pair of laterally spaced tractor carried lift arms, and laterally spaced forward beam portions secured to said lift bar, a draft pole having a forward end adapted for connection with a tractor and a rear portion secured for lateral adjustment to said lift bar with said lift bar providing a transverse pivot axis for vertical swinging movement of said draft pole, a part rigid with said draft pole and forming a beaming tower, a first pivot member supported in said beaming tower, a second pivot member supported in said plow frame rearwardly of said first pivot member, a longitudinally adjustable member having ends supported in said pivot members, said member preventing movement of said pivot members toward each other to rigidly unite said draft pole and said frame against upward swinging movement of one relative to the other when said plow is in ground engaging position, one end of said longitudinal member being longitudinally slidable in one of said pivot members to permit said implement frame and draft pole to freely pivot in a downward swinging movement relative to one another as said plow is raised from ground engaging position and for any laterally adjusted position of said frame relative to said draft pole.

2. In combination, a tractor, an implement including a vertically rigid frame, a wheel adapted for travel on the ground and mounted for up and down movement relative to said implement frame at the trailing end thereof so as to support the trailing end of said frame and leave the forward end unsupported, a draft pole pivotally connected to the forward end of said frame about a first pivot center for vertical swinging movement therebetween, said draft pole having a forward end hitched to said tractor for up and down swinging movement relative thereto about a second pivot center, a power lift system operable to urge the forward end of said implement frame upwardly relative to said tractor and permit said implement frame to swing downwardly relative to said draft pole about said first pivot center, adjustable beaming means interconnecting said draft pole and said implement frame for varying the vertical angle between said draft pole and said implement frame, said beaming means rigidly uniting said draft pole and said frame only against relative upward swinging movement of said trailing end of said frame on said draft pole about said first pivot center.

3. An implement adapted for connection in semi-mounted trailing relation with a tractor having rearwardly extending power lift arms, said implement comprising a frame and a rigid draft structure having a rear portion connected to a forward portion of said frame on a transverse pivot axis affording relative up and down movement between said draft structure and frame, said draft structure presenting a forward portion adapted for connection in universally swingable draft transmitting relation with the tractor, a beaming structure comprising a part rigid with said draft structure, a first pivot member supported by said part in vertically spaced relation to said frame, a second pivot member carried by said frame in rearwardly spaced relation to said first pivot member, and a member fixed to one of said pivot members and connected by a lost motion arrangement to said other pivot member, said lost motion arrangement constructed to prevent lost motion between said member and said other pivot member until said forward portion of said frame is moved upward from normal ground working position, and lift transmitting means adapted for connection with the power lift arms of the tractor and being so connected with said frame that an upward movement of the lift arms effects a corresponding upward movement of said part.

4. A moldboard plow adapted for connection in semi-mounted trailing relation with a tractor having rearwardly extending power lift arms, said plow comprising a frame and one or more plow bottoms mounted on said frame, a rigid draft structure having a rear portion connected to a forward portion of said frame on a transverse pivot axis affording relative up and down movement between said draft structure and frame, said draft structure presenting a forward portion adapted for connection in universally swingable draft transmitting relation with the tractor, a plow beaming structure comprising a part rigid with said draft structure, a first pivot member supported by said part in spaced relation to said frame, a second pivot member carried by said frame in spaced relation to said first pivot member, and a member fixed to one of said pivot members and connected by a lost motion arrangement to said other pivot member, said lost motion arrangement constructed to prevent lost motion between said member and said other pivot member until said forward portion of said frame is moved upward from normal ground working position, and lift transmitting means adapted for connection with the power lift arms of the tractor and being so connected with said frame that an upward movement of the lift arms effects a corresponding upward movement of said part.

5. A moldboard plow adapted for connection with a tractor having rearwardly extending power lift arms, said plow comprising a frame and front and rear plow bottoms mounted on said frame, lift transmitting means secured to said frame forwardly of said front plow bottom and adapted for connection to said power lift arms, a rigid draft tongue having a forward end adapted for connection in universally swingable draft transmitting relation with the tractor, said draft tongue having a rear portion connected to a forward portion of said frame about a transverse pivot axis, and a plow beaming structure comprising a part rigid with said draft tongue, a pivot member supported in said part spaced from said frame and said draft tongue, a second pivot member supported in said frame and spaced from said part, and a rigid member fixed to one of said pivot members and connected by a one way lost motion arrangement to the other of said pivot members, said rigid member rigidly uniting said frame relative to said draft tongue only against upward swinging movement of the trailing end of said frame relative to said draft tongue when said frame is lowered and said plow bottoms are at a normal ground working depth, said lost motion connection permitting the forward portion of said frame to move upwardly upon implement raising operation of said lift arms so that the front plow bottom and then the rear plow bottom successively leave the soil.

6. A moldboard plow adapted for connection in semi-mounted trailing relation with a tractor having rearwardly extending power lift arms, said plow comprising a frame and front and rear plow bottoms mounted on said frame, lift transmitting means secured to said frame forwardly of said front plow bottom and adapted for connection to said power lift arms, a ground engaging support wheel connected to said frame for up and down movement relative thereto in trailing relation to said rear plow bottom and operable to support the trailing end of said frame in raised transport position, a rigid draft tongue having a forward end adapted for connection in universally swingable draft transmitting relation with the tractor, said draft tongue having a rear portion connected to a forward portion of said frame about a transverse pivot axis, and a plow beaming structure comprising a first part including laterally spaced members rigid with the draft pole and having aligned concave spherical bearing surfaces in adjacent faces of said members of said first part, a second part including laterally spaced members rigid with said frame at a point spaced rearwardly of said first part and having aligned concave spherical bearing surfaces in adjacent faces of said members of said second part, a first ball pivot and a second ball pivot seated respectively on the bearing surfaces of said first and second parts, and a longitudinally adjustable member having one end supported in one of said ball pivots and the other end connected by a one way lost motion arrangement to the other of said ball pivots, said member rigidly uniting said draft tongue with said frame only against relative upward swinging of said frame on said draft tongue when said frame is lowered and said plow bottoms are at a predetermined normal ground working depth, said lost motion connection permitting relative downward swinging movement of said frame on said draft tongue upon raising of the frame by said power lift arms so that the front plow bottom and then the rear plow bottom successively leave the soil.

7. A moldboard plow adapted for connection in semi-mounted trailing relation with a tractor having rearwardly extending power lift arms, said plow comprising a frame and front and rear plow bottoms mounted on said frame, lift transmitting means secured to said frame forwardly of said front plow bottom and adapted for connection to said power lift arms, a ground engaging support wheel connected to said frame in trailing relation to said rear plow bottom to support the trailing end of said frame, means to move said support wheel up and down relative to said frame to position said frame either in ground working or in raised transport position, a rigid draft tongue having a forward end adapted for connection in universally swingable draft transmitting relation with the tractor, said draft tongue having a rear portion connected to a forward portion of said frame about a transverse pivot axis, and a plow beaming structure comprising a first part including laterally spaced members rigid with the draft pole and having aligned concave spherical bearing surfaces in adjacent faces of said members of said first part, a second part including laterally spaced members rigid with said frame at a point spaced rearwardly of said first part and having aligned concave spherical bearing surfaces in adjacent faces of said members of said second part, a first ball pivot and a second ball pivot seated respectively on the bearing surfaces of said first and second parts, and a longitudinally adjustable member having one end longitudinally fixed but freely rotatable in one of said ball pivots and the other end connected by one way lost motion arrangement wherein said other end is longitudinally slidable but radially fixed to the other of said ball pivots, said member rigidly uniting said draft tongue with said frame only against relative upward swinging of said frame on said draft tongue when said frame is lowered and said plow bottoms are at a predetermined normal ground working depth, said lost motion connection permitting relative downward swinging movement of said frame on said draft tongue upon raising of the frame by said power lift arms so that the front plow bottom and then the rear plow bottom successively leave the soil.

References Cited in the file of this patent

UNITED STATES PATENTS

| 1,115,902 | Coughenour | Nov. 3, 1914 |
|---|---|---|
| 2,363,749 | Rude | Nov. 28, 1944 |
| 2,456,693 | Fraga | Dec. 21, 1948 |
| 2,650,529 | Tanke | Sept. 1, 1953 |
| 2,685,241 | Silver et al. | Aug. 3, 1954 |
| 2,687,680 | Heckathorn et al. | Aug. 31, 1954 |
| 2,704,018 | Oehler et al. | Mar. 15, 1955 |

FOREIGN PATENTS

| 324,756 | Germany | Sept. 11, 1920 |
|---|---|---|